United States Patent
Zhou et al.

(10) Patent No.: US 12,351,152 B2
(45) Date of Patent: *Jul. 8, 2025

(54) EMERGENCY BRAKING FOR AUTONOMOUS VEHICLES

(71) Applicant: Waymo LLC, Mountain View, CA (US)

(72) Inventors: Shiying Zhou, Sunnyvale, CA (US); Jens-Steffen Ralf Gutmann, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 420 days.

This patent is subject to a terminal disclaimer.

(21) Appl. No.: 17/567,484

(22) Filed: Jan. 3, 2022

(65) Prior Publication Data

US 2022/0169214 A1 Jun. 2, 2022

Related U.S. Application Data

(63) Continuation of application No. 17/010,090, filed on Sep. 2, 2020, now Pat. No. 11,242,040, which is a
(Continued)

(51) Int. Cl.
*B60T 8/17* (2006.01)
*B60T 7/22* (2006.01)
(Continued)

(52) U.S. Cl.
CPC .............. *B60T 8/171* (2013.01); *B60T 7/22* (2013.01); *B60T 8/17* (2013.01); *B60T 8/58* (2013.01);
(Continued)

(58) Field of Classification Search
CPC ....................................................... B60T 8/171
See application file for complete search history.

(56) References Cited

U.S. PATENT DOCUMENTS 5,208,591 A * 5/1993 Ybarra ................. G01S 13/781
342/36
9,682,689 B2 * 6/2017 Parker ..................... B60T 8/171
(Continued)

FOREIGN PATENT DOCUMENTS

WO 2018115963 A2 6/2018

*Primary Examiner* — Dino Kujundzic
(74) *Attorney, Agent, or Firm* — Botos Churchill IP Law (57) ABSTRACT

Aspects of the disclosure provide for generation of trajectories for a vehicle driving in an autonomous driving mode. For instance, information identifying a plurality of objects in the vehicle's environment and a confidence value for each of the objects is received. A set of constraints may be generated. That one or more processors are unable to solve for a trajectory given the set of constraints and an acceptable braking limit may be determined. A first constraint is identified as a constraint for which could not be solved and a first confidence value. That the vehicle should apply a maximum braking level is determined based on the identified first confidence value, a threshold, and the determination that the one or more processors are unable to solve for a trajectory. Based on the determination that the vehicle should apply the maximum braking level, the maximum braking level is applied.

19 Claims, 10 Drawing Sheets

Related U.S. Application Data continuation of application No. 16/151,862, filed on Oct. 4, 2018, now Pat. No. 10,793,123.

(51) Int. Cl.
*B60T 8/171* (2006.01)
*B60T 8/58* (2006.01)

(52) U.S. Cl.
CPC ....... *B60T 2210/14* (2013.01); *B60T 2210/32* (2013.01); *B60T 2250/04* (2013.01)

(56) References Cited

U.S. PATENT DOCUMENTS

| | | |
|---|---|---|
| 9,862,364 B2 | 1/2018 | Fairfield |
| 9,963,127 B2 | 5/2018 | Pilutti et al. |
| 10,303,166 B2 | 5/2019 | Iagnemma |
| 2015/0073662 A1* | 3/2015 | Schmudderich ...... B60W 40/04 701/1 |
| 2015/0336547 A1* | 11/2015 | Dagan .................... G06V 20/58 701/70 |
| 2016/0167519 A1 | 6/2016 | Luke et al. |
| 2016/0327953 A1 | 11/2016 | Nilsson et al. |
| 2017/0147582 A1* | 5/2017 | Michels ............ G06F 16/24578 |
| 2017/0158175 A1* | 6/2017 | Fairfield ......... B60W 60/00276 |
| 2017/0336788 A1 | 11/2017 | Iagnemma |
| 2018/0089911 A1 | 3/2018 | Rath et al. |
| 2018/0173970 A1 | 6/2018 | Bayer et al. |
| 2018/0186366 A1* | 7/2018 | Gordon ............... B60W 30/085 |
| 2019/0155292 A1 | 5/2019 | Gutmann et al. |
| 2019/0241161 A1* | 8/2019 | Aitidis .................. B60W 30/09 |
| 2020/0001862 A1 | 1/2020 | Luo et al. |

\* cited by examiner

EMERGENCY BRAKING FOR AUTONOMOUS VEHICLES

CROSS REFERENCE TO RELATED APPLICATIONS

The present application is a continuation of U.S. application Ser. No. 17/010,090, filed Sep. 2, 2020, which is a continuation of U.S. application Ser. No. 16/151,862, filed Oct. 4, 2018, now issued as U.S. Pat. No. 10,793,123, the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location by controlling various systems of the vehicles, including acceleration and deceleration (braking) systems of the vehicle.

BRIEF SUMMARY

One aspect of the disclosure provides a method of generating trajectories for a vehicle driving in an autonomous driving mode. The method includes receiving, by one or more processors, from a perception system of the vehicle, information identifying a plurality of objects in an environment of the vehicle and a confidence value for each object of the plurality of objects being a real object; generating, by the one or more processors, a set of constraints, a first constraint of the set of constraints being generated based on a first object of the objects of the plurality of objects; determining, by the one or more processors, that the one or more processors are unable to solve for a trajectory given the set of constraints and an acceptable braking limit; identifying, by the one or more processors, the first constraint as a constraint for which the one or more processors were unable to solve for a trajectory and a first confidence value, the first constraint corresponding to the first object that is associated with the first confidence value; determining, by the one or more processors, that the vehicle should apply a maximum braking level greater than the acceptable braking limit based on the identified first confidence value, a threshold, and the determination that the one or more processors are unable to solve for a trajectory; and based on the determination that the vehicle should apply the maximum braking level, applying, by the one or more processors, the maximum braking level to control the vehicle in the autonomous driving mode and in order to slow the vehicle down.

In one example, the method also includes for each given object of the plurality of objects, determining a priority level based on the confidence value and a type of the given object; comparing the determined priority levels to a threshold value; and based on the comparison, flagging at least the first constraint to indicate that the first object allows for the maximum braking level. In this example, determining that the vehicle should apply a maximum braking level is further based on the flagged first constraint. In another example, the method also includes for each given object of the plurality of objects, determining a priority level based on the confidence value and a type of the given object; comparing the determined priority levels to a threshold value; and based on the comparison, flagging at least the first object to indicate that the first object allows for the maximum braking level. In this example, determining that the vehicle should apply a maximum braking level is further based on the flagged first object. In another example, the first confidence value corresponds to a number of iterations of a LIDAR sensor of the perception system in which the one of the plurality of objects has been observed. In another example, the method also includes receiving for the first object, a type of the first object; and determining a priority level based on the first confidence value and the type of object, and wherein determining that the vehicle should apply a maximum braking level is further based on the priority level. In this example, determining that the vehicle should apply a maximum braking level is further based on a comparison between the priority level and the threshold. In addition or alternatively, the method also includes determining that the priority level meets the threshold, and wherein determining that the vehicle should apply the maximum braking level is further based on the determination that the priority level meets the threshold. In another example, determining that the vehicle should apply the maximum braking level is further based on a current speed of the vehicle. In another example, determining that the vehicle should apply the maximum braking level is further based on a detected speed of one or more of the plurality of objects. In another example, determining that the vehicle should apply the maximum braking level is further based on a type of road on which the vehicle is currently driving. In another example, determining that the vehicle should apply the maximum braking level is further based on whether the vehicle is currently driving on a highway. In another example, the maximum braking level corresponds to a maximum braking limit for brakes of the vehicle. In another example, determining that the vehicle should apply the maximum braking level is further based on a speed limit of a road on which the vehicle is traveling. In another example, determining that the vehicle should apply the maximum braking level is further based on a speed of a second vehicle in the environment of the vehicle. In another example, applying the maximum braking level is further based on whether a second vehicle is behind the vehicle. In this example, applying the maximum braking level is further based on whether the second vehicle meets a predetermined threshold with respect to a current location of the vehicle. In another example, determining that the vehicle should apply the maximum braking level is further based on a current driving situation for the vehicle, wherein the current driving situation relates to an environment in which the vehicle is currently driving.

Another aspect of the disclosure provides a system for generating trajectories for a vehicle driving in an autonomous driving mode. The system includes one or more processors configured to receive from a perception system of the vehicle, information identifying a plurality of objects in an environment of the vehicle and a confidence value for each object of the plurality of objects being a real object; generate a set of constraints, a first constraint of the set of constraints being generated based on a first object of the objects of the plurality of objects; determine that the one or more processors are unable to solve for a trajectory given the set of constraints and an acceptable braking limit; identify the first constraint as a constraint for which the one or more processors were unable to solve and a first confidence value, the first constraint corresponding to the first object that is associated with the first confidence value; determine that the vehicle should apply a maximum braking level greater than the acceptable braking limit based on the identified first confidence value, a threshold, and the determination that the one or more processors are unable to solve for a trajectory; and based on the determination that the vehicle should apply the maximum braking level, apply the maximum braking level to control the vehicle in the autonomous driving mode and in order to slow the vehicle down. In one example, the system also includes the vehicle.

DETAILED DESCRIPTION

Overview

The technology relates to allowing a vehicle to initiate emergency braking when the confidence an object is in the path of the vehicle is high. In this regard, a vehicle, such as an autonomous vehicle, may follow a projected path at a certain speed and/or acceleration. When an object is detected in the vehicle's projected path, the vehicle may be required to make an emergency maneuver, such as sharply turning or braking hard to avoid colliding with the object. As such, objects which have low confidence values, indicating that there is a low certainty of the objects actually being present, may result in unnecessary hard braking being performed by the autonomous vehicle. However, these hard braking may increase the risk of other vehicles colliding with the autonomous vehicle (for instance, a tailgater may rear-end the vehicle) and decrease rider comfort. To address this, hard braking may only be enabled when the detected objects have high confidence values.

As the vehicle drives around, the vehicle's perception system may detect and identify objects and their characteristics. Each detected object may be associated with a confidence value identifying how confident the perception system is that the object is "real." The more the object is perceived by the sensors of the perception system, the greater the confidence value that the object is a real, correctly identified object, with more reliable estimates of position, orientation and speed. The confidence values and type for each identified object may be used to determine a priority level for each object.

The vehicle's computing devices may also determine whether the priority level for each object meets a threshold. If so, for instance because the priority is greater than or equal to the threshold, the constraint for that object and/or the object may be flagged or otherwise marked as allowing for an emergency braking or maximum braking level.

The vehicle's computing devices may generate a set of constraints based on the objects. For instance, the objects and their characteristics, such as location, speed, heading, orientation, predicted behaviors, etc. may be used to generate a set of constraints identifying locations at certain times at which the vehicle should not be in order to avoid collision.

The set of constraints may be used to attempt to generate trajectories that allow the vehicle to maintain safe and comfortable traveling conditions. For instance, the set of constraints may be used to generate a trajectory for the vehicle by solving for a trajectory that satisfies all of the constraints while allowing the vehicle to brake at no greater than an acceptable braking level. In certain circumstances, the vehicle's computing devices may not be able to solve for all of the constraints. In such situations, the vehicle's computing devices may apply the brakes of the vehicle at the maximum braking level and, in some cases, also employ a parking brake if available. As such, the vehicle's computing devices may automatically apply the maximum braking level without specifically attempting to solve for the set of constraints.

However, as noted above, higher levels of braking limit may increase risk of other vehicles colliding with the autonomous vehicle and decrease rider comfort. As such, before applying the maximum braking level, the vehicle's computing devices may identify a constraint for which the vehicle's computing devices are not able to solve for a trajectory and determine whether the constraint and/or the corresponding object for that constraint has been flagged to allow for maximum braking level.

The features described herein may allow the vehicle's computing devices to use emergency braking in a safe and reliable way. By tying this braking to the confidence value that an object detected by the perception system exists as well as the type of that object, this reduces the likelihood of unnecessary, and in some cases, dangerous braking in inappropriate circumstances. This, in turn, increases the safety and comfort of passengers within the vehicle.

Example Systems

Figure 1:
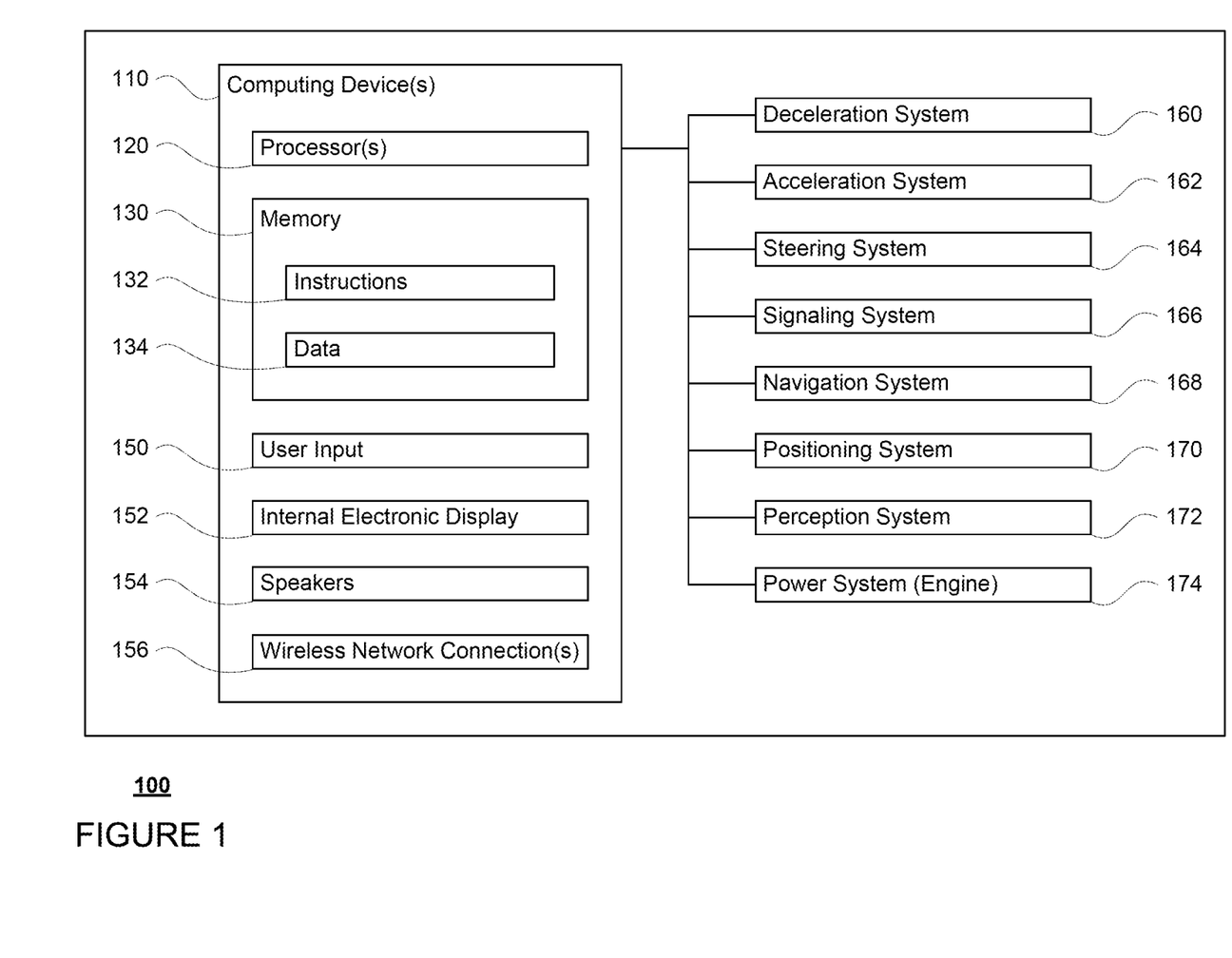
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160 (for instance, including the features connected or otherwise attached to the brake pedal of the vehicle), acceleration system 162 (for instance, including the features connected or otherwise attached to the accelerator pedal of the vehicle), steering system 164, signaling system 166, routing system 168, positioning system 170, perception system 172, and power system 174 (i.e. the vehicle's engine or motor) in order to control the movement, speed, etc. of vehicle 100 in accordance with the instructions 132 of memory 130. For instance, the computing devices 110 may generate trajectories for the vehicle 100 to follow and control the vehicle according to the trajectory by sending commands to the deceleration system 160 (to control braking power and accordingly, deceleration) as well as acceleration system 162 (to control acceleration and changes in acceleration). Again, although these systems are shown as external to computing devices 110, in actuality, these systems may also be incorporated into computing devices 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

Figure 2:
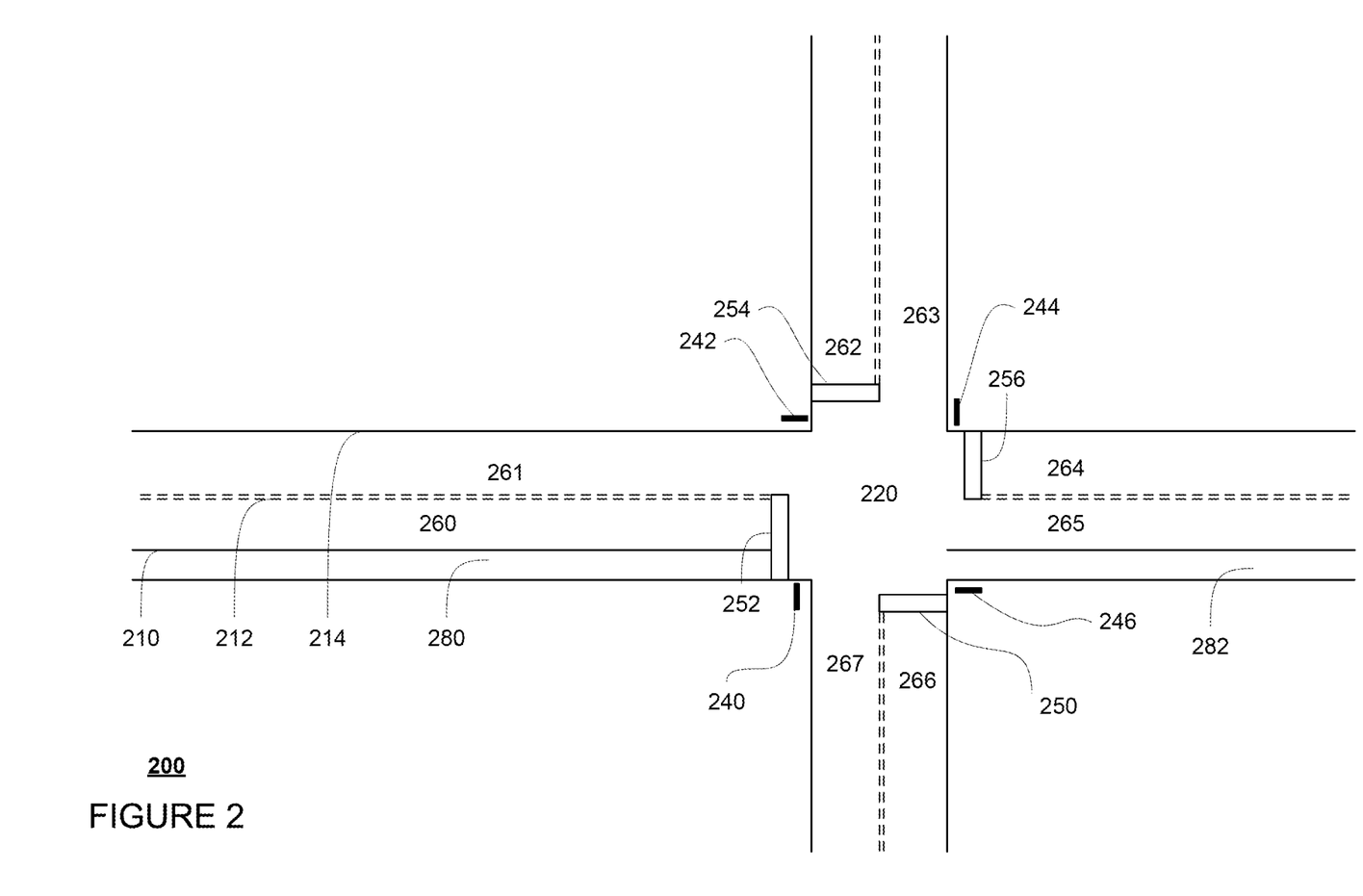
FIG. 2 is an example representation of map information in accordance with aspects of the disclosure.

FIG. 2 is an example of map information 200 for a section of roadway including intersection 220. In this example, map information 200 depicts a portion of the map information that includes information identifying the shape, location, and other characteristics of lane markers or lane lines 210, 212, 214, stop signs 240, 242, 244, 246, as well as stop lines 250, 252, 254, 256. The lane lines may also define various lanes 260, 261, 264, 265, implied by the width of a road, such as lanes 262, 263, 266, 267, and/or lanes 260-267 may also be explicitly identified in the map information 200. In this example, map information 200 also identifies bicycle lanes 280, 282. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
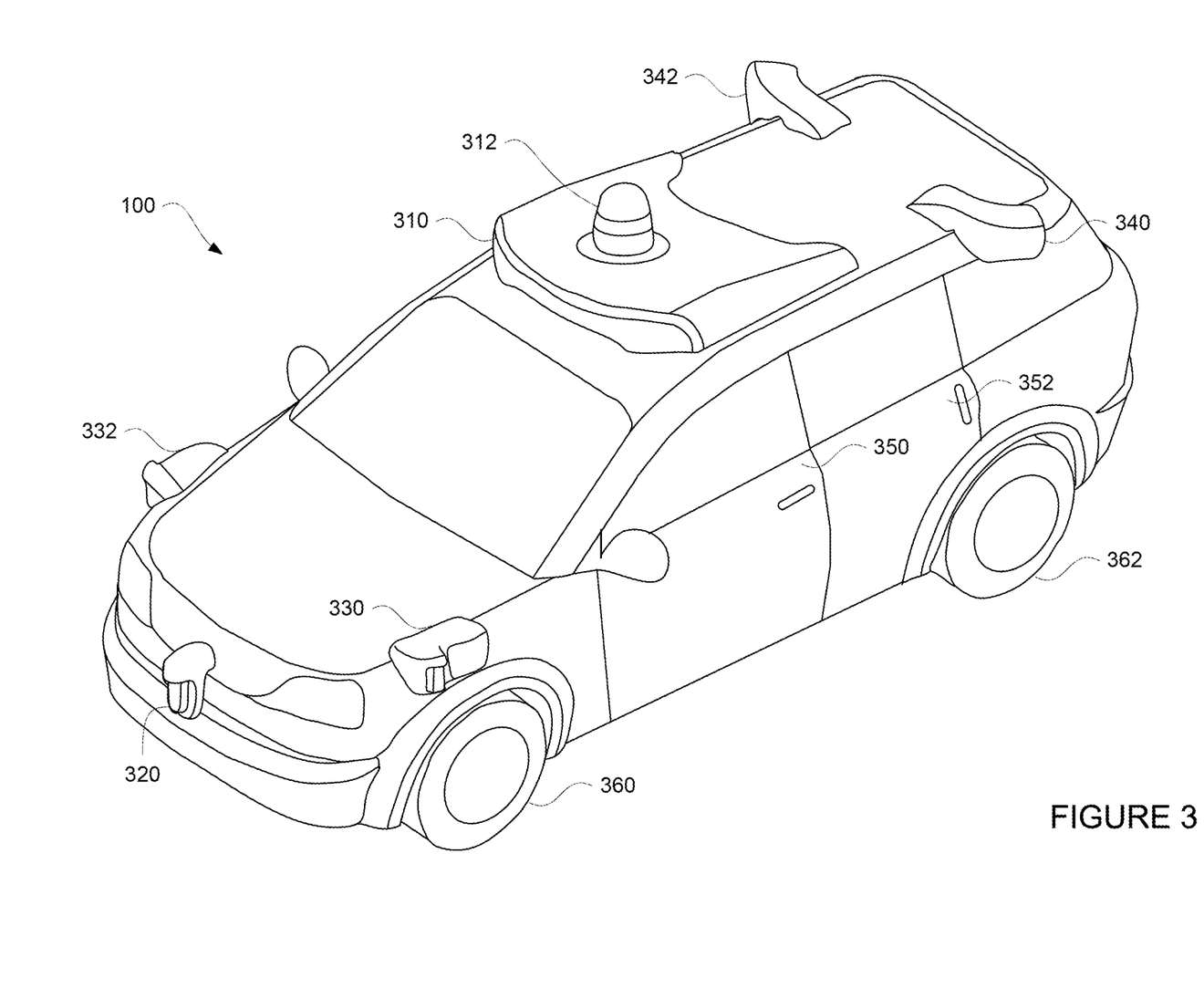
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing devices 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

In one example, computing devices 110 may be operable to predict another vehicle's future movement based solely on the other vehicle's instant direction, acceleration/deceleration and velocity, e.g., that the other vehicle's current direction and movement will continue. However, memory 130 may also store behavior models that provides the probability of one or more actions being taken a detected object. To increase the usefulness of these behavior models, each behavior model may be associated with a specific type of object. For instance, one type of behavior model may be used for objects identified as pedestrians, another type of behavior model may be used for objects identified as vehicles, another type of behavior may be used for objects identified as bicycles or bicyclists, etc. The behavior models may be used by the computing devices 110 in order to predict a detected object future movement by analyzing data relating to the other vehicle's current surroundings and determining how that other object will likely respond to those surroundings. In this regard, the behavior models may function from an object-centric, view of the object's environment, in that the system determines what the other objects are perceiving in order to better predict how those objects will behave. In this regard, in at least some instances, the behavior models may also indicate whether the predicted behavior for an object is responsive to a particular other object including the vehicle 100.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, the computing devices 110 may use the routing system to determine a route to a destination. The computing devices 110 may then periodically generate trajectories, for instance every 0.1 times per second or more or less, for the vehicle to follow for some time and distance into the future in order to follow the route to the destination. As noted above, these trajectories are generated as "desired paths" in order to avoid obstacles, obey laws and generally drive safely and effectively. Each trajectory may define various requirements for the vehicle's acceleration, speed, and position at different times along the trajectory. In this regard, the trajectory may include both geometry and speed/acceleration components. The computing devices 110 may operate to manage steering, powertrain and braking in order to cause the vehicle to follow the trajectory. The computing devices 110 may receive feedback from the vehicles sensors including sensors of and/or the perception system 172 and the positioning system 170. This feedback may include information such as the current acceleration, speed, and position of the vehicle as well as those characteristics of objects detected in the vehicle's environment.

Figure 4:
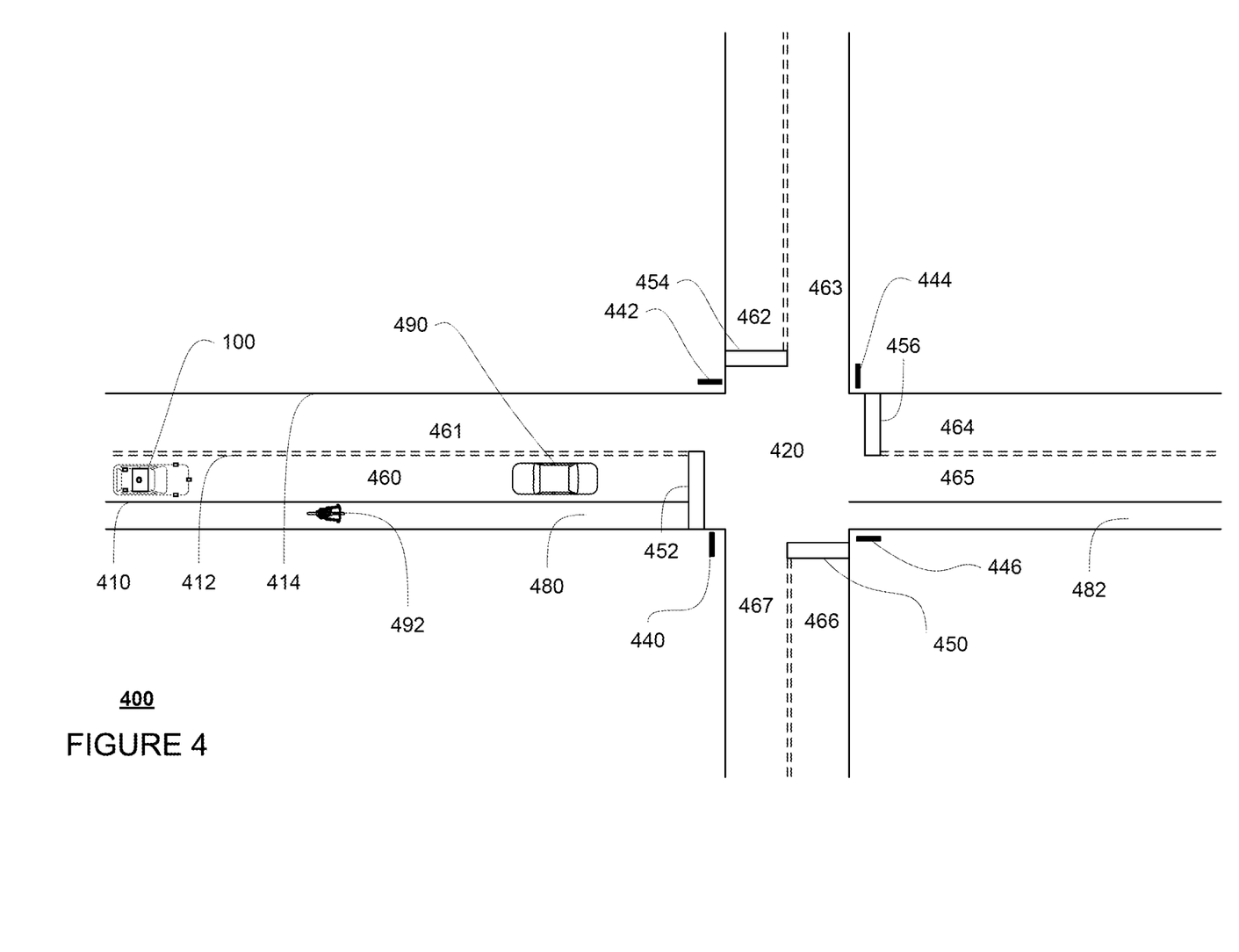
FIG. 4 is a view of a section of roadway in accordance with aspects of the disclosure.

FIG. 4 is an example 400 bird's eye view of a section of roadway corresponding to map information 200. In this example, the shape location and other characteristics of intersection 420, lane lines 410, 412, 414, stop signs 440, 442, 444, 446, stop lines 450, 452, 454, 456, lanes 460-467, and bicycle lanes 480, 482, may generally correspond to the shape location and other characteristics of intersection 220, lane lines 210, 212, 214, stop signs 240, 242, 244, 246, stop lines 250, 252, 254, 256, lanes 260-268, and bicycle lanes 280, 282 respectively. In this example, vehicle 100 is driving in lane 460 towards intersection 420. In addition, another vehicle 490 is also driving in lane 460 towards intersection 420, and a bicyclist 492 is riding in bike lane 480 towards intersection 420 as well.

Figure 5:
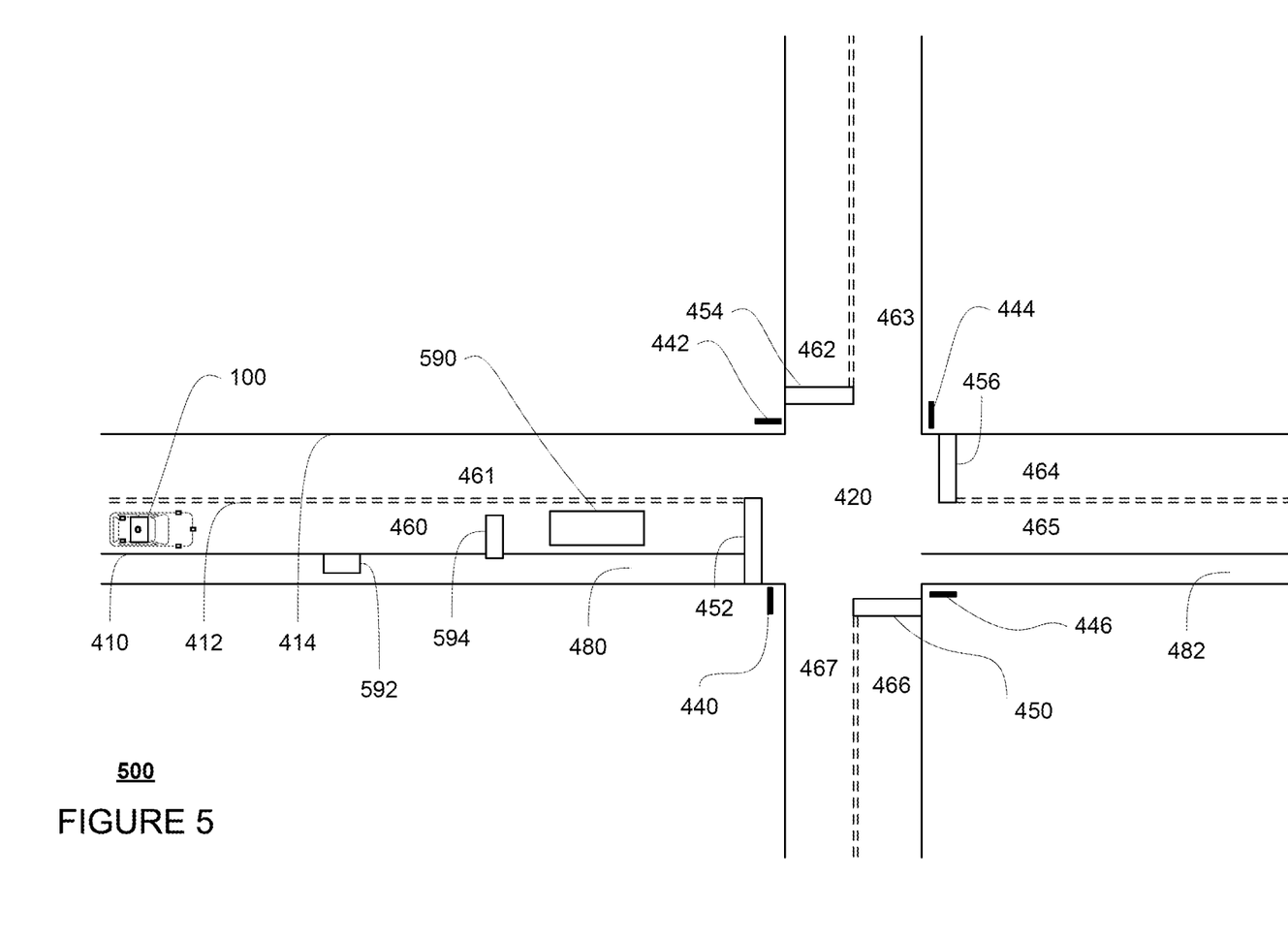
FIG. 5 is a view of a section of roadway and data in accordance with aspects of the disclosure.

As the vehicle drives around, the perception system 172 and/or computing devices 110 may detect and identify objects and their characteristics. For instance, as shown in example 500 of FIG. 5, the perception system 172 may detect various objects in the vehicle's environment. In addition to the features of the map information 200, the perception system 172 may also detect and identify objects such as objects represented by bounding boxes 590, 592, and 594. In this example, the bounding boxes represent an estimated size, shape, orientation and location of the detected objects and may "bound" the data points, such as LIDAR sensor data points or camera image data points, relative to the example 600.

Each detected object may be associated with a confidence value identifying how confident the perception system is that the object is "real." These confidence values may be determined by the perception system 172 and/or computing devices 110. For instance, if an object or a point cloud is only perceived by a single sensor, such as a LIDAR sensor, 1 or 2 times (1 or 2 sensor iterations), it is possible that the object is not a real object, but simply noise, reflections, or exhaust vapor from another vehicle. Similarly, some objects, such as small vegetation or debris, may appear to be moving and may be detected as another road user, but may simply be swaying in the wind. Thus, the confidence value would be very low. For instance, bounding box 594 may be associated with a very low confidence value. As such, turning to example 600 of FIG. 6, bounding box 594 may represent data points for an object that has only been perceived during 1 or 2 sensor iterations. As such, this bounding box is associated with a very low confidence of 0.1 on a scale of 0 to 1, where zero is low confidence and 1 is high confidence. Of course, other scales and values may be used. Moreover, the fewer the number of iterations of the LIDAR sensor that the object is identified, the more difficult it is to determine the object's characteristics such as speed, type, and heading as well as to predict the object's behavior (for instance, using behavior models as discussed above). As such, estimates made by the perception system 172 and/or computing devices 110 of the bounding box 594's speed, type, heading, and behavior may be very inaccurate. In this regard, bounding box 594 may be estimated to be a small vehicle, but in reality may simply be exhaust from vehicle 490 and/or other road debris such as leaves, trash, etc.

Figure 6:
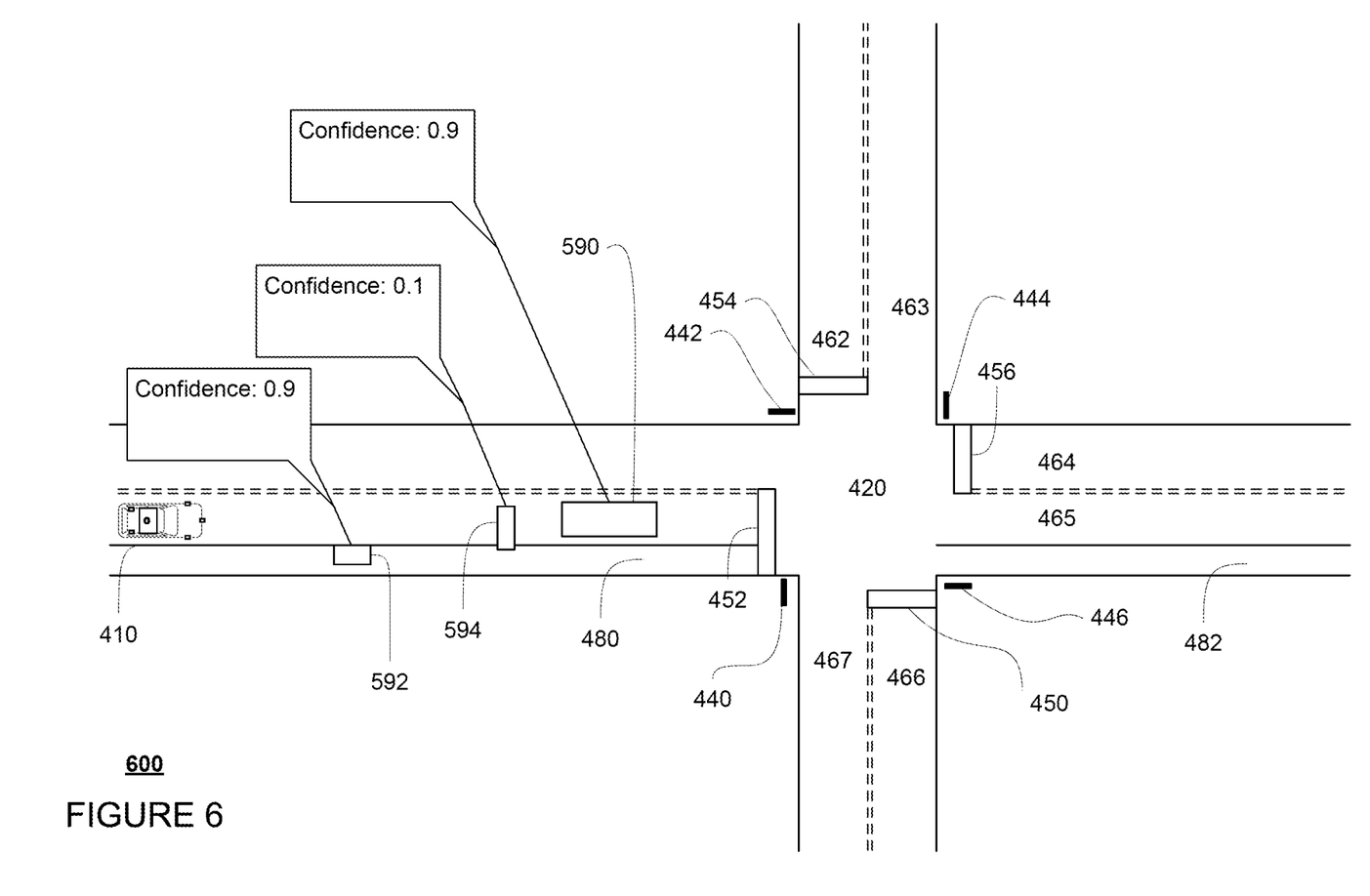
FIG. 6 is another view of a section of roadway and data in accordance with aspects of the disclosure.

The more the object is perceived, for instance, the longer an object is tracked or the more sensor iterations in which the object is detected by the sensors of the perception system, the greater the confidence value that the object is a real, correctly identified object, with more reliable estimates of position, orientation and speed. In this regard, higher confidence value objects may be perceived over several, for instance at least 3-5 or more iterations of the perception system. As an example, bounding boxes 590 and 592, representing vehicle 490 and bicyclist 492, respectively, are each associated with a relatively high confidence value, here 0.9 on the aforementioned scale of 0 to 1, given the fact that these objects have been observed over the course of many different sensor iterations. In addition, the characteristics of these objects, such as speed, type, heading as well as behavior predictions may also be more accurate. In this regard, bounding box 590 may be identified as a vehicle by perception system 172 and/or computing devices 110, and bounding box 592 may be identified as a bicyclist by perception system 172 and/or computing devices 110.

Figure 7:
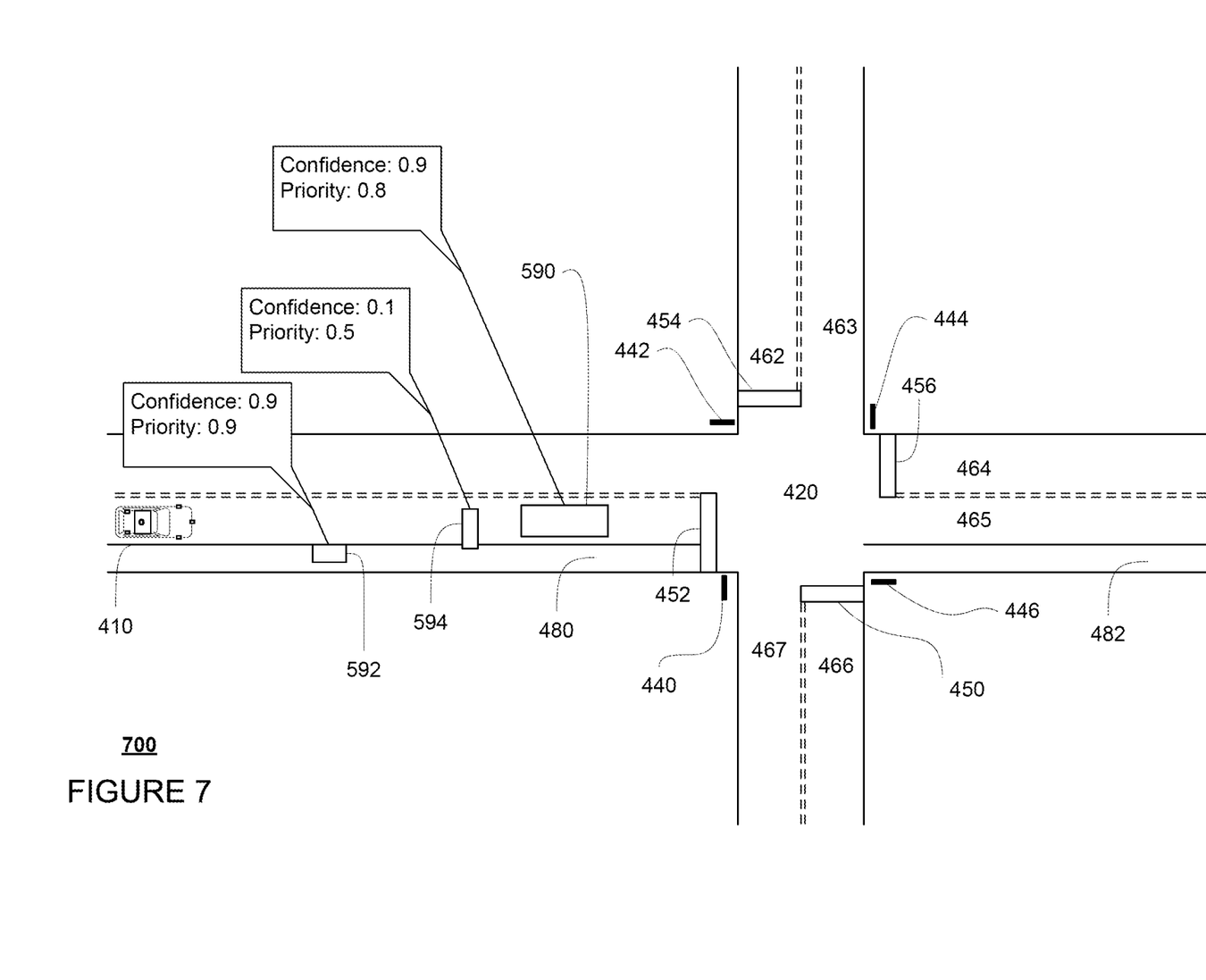
FIG. 7 is another view of a section of roadway and data in accordance with aspects of the disclosure.

The confidence values and identified type for each identified object may be used by the computing devices 110 to determine a priority level for those objects. For instance, objects for which the vehicle is more likely to need to slow down, such as vehicles, bicyclists and pedestrians may be assigned a higher priority than objects such as traffic cones, vegetation, or trash. In addition, objects having higher confidence values may be assigned higher priority. For instance, vegetation having a higher confidence value would have a higher priority than vegetation with a lower confidence value. moreover, rather than being a ranked priority level, the priority level may simply be on a fixed scale, such as 0 to 1 where 0 is low priority and 1 is high priority, such that different objects may have the same priority level if such objects would have the same type and confidence value. Again, other scales and values may be used. Turning to example 700 of FIG. 7, given their identified types and confidence values, bounding boxes 590 and 592 may be relatively high, or 0.8 and 0.9, respectively, on the aforementioned scale of 0 to 1. However, although bounding box 594 has been identified as a vehicle, because the confidence value is relatively low, 0.1, the priority of the bounding box 594, is also relatively low, or 0.2 on a scale of 0 to 1.

Figure 9:
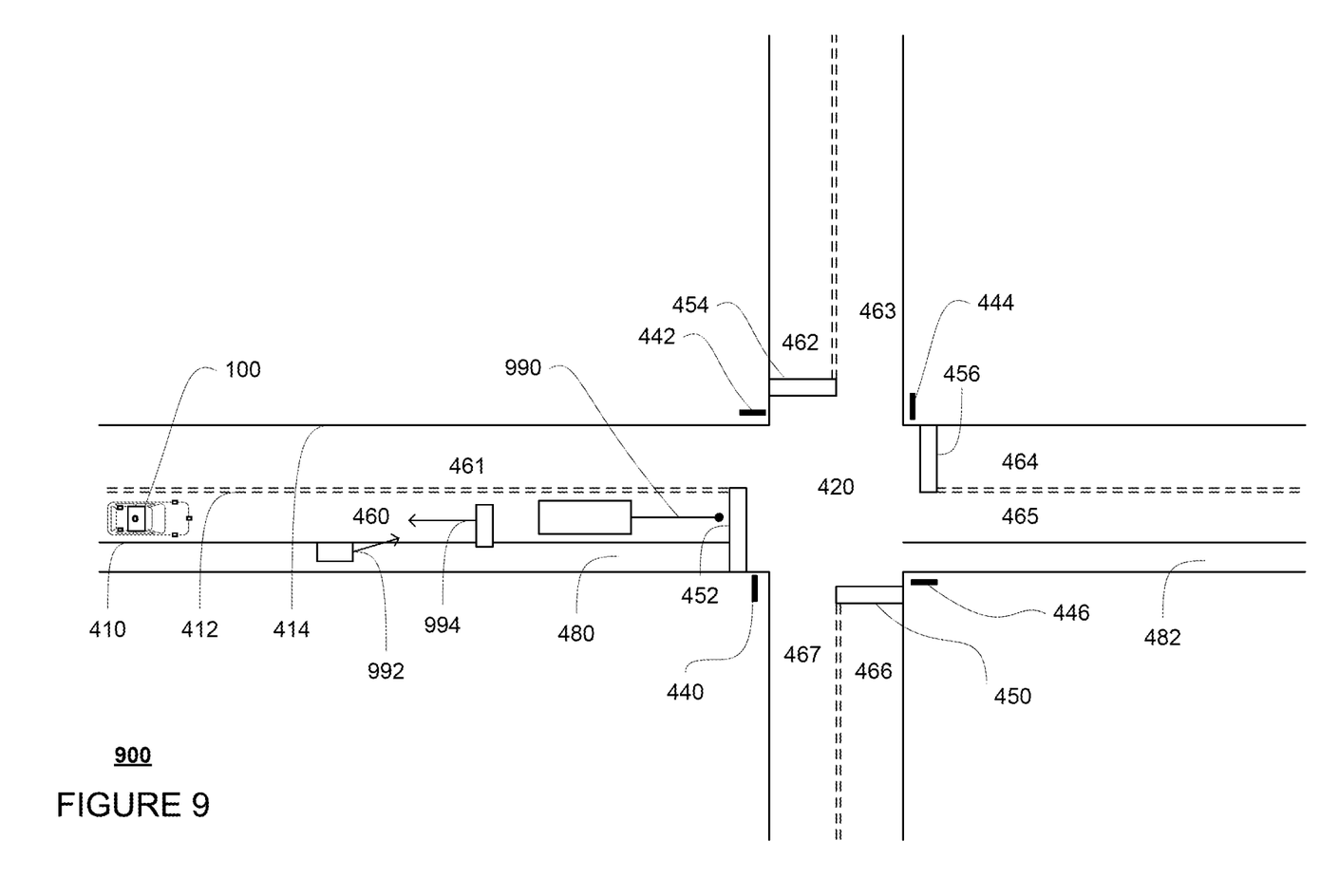
FIG. 9 is another view of a section of roadway and data in accordance with aspects of the disclosure.

The computing devices 110 may generate a set of constraints. For instance, the objects and their characteristics, such as location, speed, heading, orientation, projected behaviors, etc. may be used to generate a set of constraints identifying locations at certain times at which the vehicle should not be in order to avoid collision. As an example, the constraints may include avoiding or not coming within some predetermined distances of locations on predicted behaviors or trajectories of detected objects. For instance, turning to example 900 of FIG. 9, arrows 990, 992, and 994 represent predicted trajectories for each of bounding boxes 590, 592, and 594, respectively which may be predicted based on the estimated characteristics of these objects and the map information as discussed above.

Figure 8:
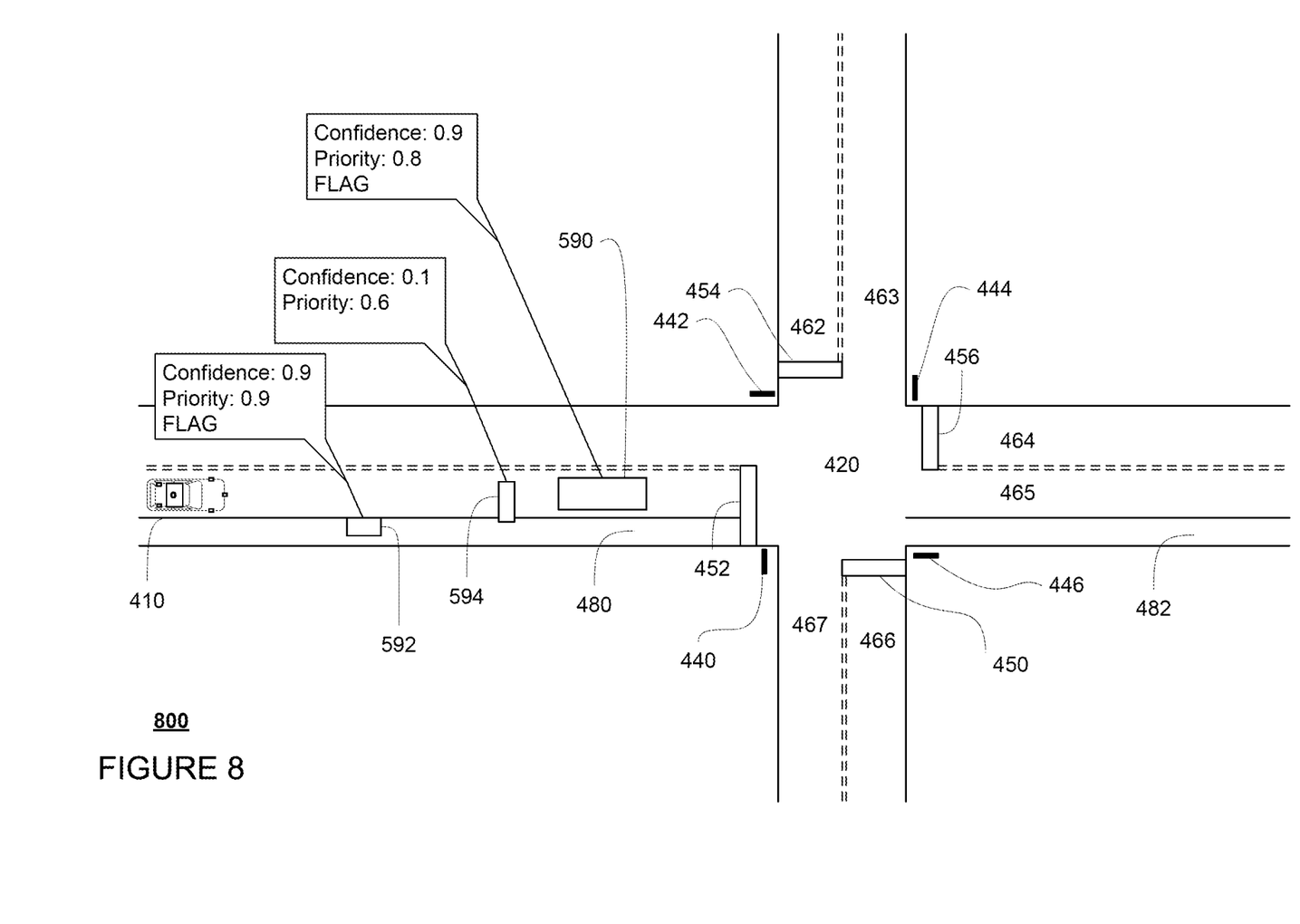
FIG. 8 is another view of a section of roadway and data in accordance with aspects of the disclosure.

The vehicle's computing devices may also determine whether the priority level for each object meets a threshold. If so, for instance because the priority is greater than or equal to the threshold, the constraint for that object and/or the object may be flagged or otherwise marked as allowing for a maximum braking level. In this regard, if the priority is too low, the constraint for that object may not allow for the maximum braking level. As such, only higher priority level objects of certain types with high confidence values would be flagged to allow for emergency braking. For instance, turning to example 800 of FIG. 8, if the threshold is 0.6, both bounding boxes 590 and 592, which have priority levels that are higher than 0.6, as shown as flagged to allow for emergency braking. Similarly, lower priority level objects of other types with low confidence values would not be flagged to allow for emergency braking. In this regard, bounding box 594 is shown as not being flagged to allow for emergency braking. In addition or alternatively, constraints may be flagged as not allowing for maximum braking level.

The set of constraints may be used to attempt to generate trajectories that allow the vehicle to maintain safe and comfortable traveling conditions. For instance, the set of constraints may be used to generate a trajectory for the vehicle by solving for a trajectory that satisfies all of the constraints while allowing the vehicle to brake at no greater than an acceptable braking level. The trajectories may be determined as a single problem (solving for geometry and speed at once) or a two-part problem (solving for geometry and thereafter speed).

The maximum braking level is greater than the acceptable braking level. For instance, the acceptable braking level may define a maximum deceleration and/or a maximum amount of jerk (derivative of deceleration) for the vehicle. These maximums for the acceptable braking level may be hand tuned in order to be comfortable to any passenger in the vehicle and reduce the likelihood of the vehicle being rear-ended by other vehicles. The maximum braking level may thus be a maximum amount of braking, maximum amount of deceleration and/or a maximum amount of jerk of which the vehicle is capable in order to slow the vehicle down as quickly as possible.

In certain circumstances, the vehicle's computing devices may not be able to solve for all of the constraints. For instance, the vehicle's computing devices may not be able to find a speed plan for a specific geometry that satisfies all of the constraints of a set of constraints. As an example, computing devices 110 may not be able to identify a speed plan which avoids coming too close to the constraints associated with the object represented by bounding box 592 corresponding to bicyclist 492. As another example, computing devices 110 may not be able to identify a speed plan which avoids coming too close to the constraints associated with the object represented by bounding box 594 corresponding to exhaust and/or other road debris. In such situations, the vehicle's computing devices may apply the brakes of the vehicle at the maximum braking level and, in some cases, also employ a parking brake if available. As such, the vehicle's computing devices may automatically apply the maximum braking level without specifically attempting to solve for the set of constraints.

However, as noted above, higher levels of braking limit may increase risk of other vehicles colliding with the autonomous vehicle and decrease rider comfort. As such, before applying the maximum braking level, the vehicle's computing devices may identify a constraint for which the vehicle's computing devices are not able to solve for a trajectory and determine whether the constraint and/or the corresponding object for that constraint has been flagged to allow for maximum braking level or really, whether the priority for the object associated with the identified constraint meets a threshold value that would allow for maximum braking level. If so, the vehicle's computing devices may simply automatically apply the maximum braking level without specifically attempting to solve for the set of constraints. For instance, if computing devices 110 may not be able to identify a speed plan which avoids coming too close to the constraints associated with the object represented by bounding box 592, because this bounding box has already been flagged and/or is associated with a priority level which meets the threshold, the computing devices may automatically apply the maximum braking level. As another example, if computing devices 110 may not be able to identify a speed plan which avoids coming too close to the constraints associated with the object represented by bounding box 594 while avoiding coming too close to bounding box 592, because bounding box 594 has not been flagged and/or is not associated with a priority level which meets the threshold, the computing devices would not automatically apply the maximum braking level.

At the same time, it may be appropriate to apply the maximum braking level in situations where the vehicle is very unlikely to cause such high risk events. In other words, not all situations may be suitable for emergency braking. For example, it may not be appropriate to increase the acceptable braking limit on a highway where the speed of traffic flow speed is relatively high as this may cause a high risk to the vehicle, passengers as well as other vehicles. In this regard, the maximum braking level may be allowed only when the vehicle's speed and the speed of other nearby vehicles are relatively low such that even if a collision were to happen, the collision would be of very low severity. As another example, before applying the maximum braking level, the computing devices 110 may first confirm that there are no tailgating vehicles behind vehicle 100, such that there are no vehicles within a predetermined threshold, measured in distances (e.g. meters) or time (i.e. seconds) or a combination of both, in a lane of and behind the current location of the vehicle 100 such that the risk of a rear collision is low.

Figure 10:
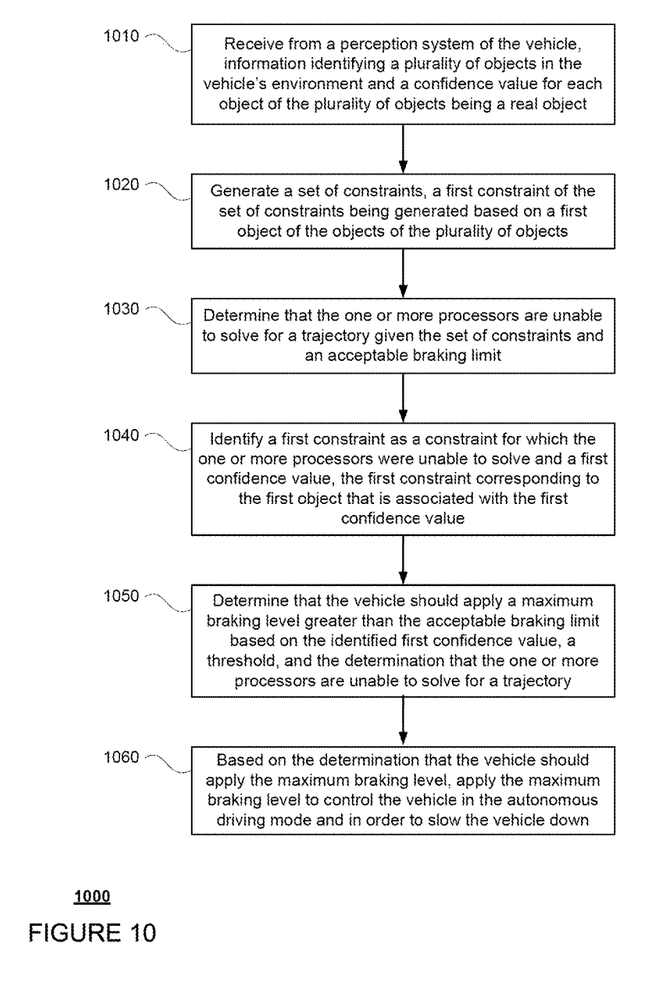
FIG. 10 is flow diagram in accordance with aspects of the disclosure.

FIG. 10 is a flow diagram 1000 that may be performed by one or more processors such as one or more processors 120 of computing device 110 in order to perform a method of generating trajectories for a vehicle driving in an autonomous driving mode. In this example, at block 1010, information identifying a plurality of objects in the vehicle's environment and a confidence value for each object of the plurality of objects being a real object is received from a perception system of the vehicle. At block 1020, a set of constraints is generated. A first constraint of the set of constraints is generated based on a first object of the objects of the plurality of objects. At block 1030, that the one or more processors are unable to solve for a trajectory given the set of constraints and an acceptable braking limit is determined. At block 1040, a first constraint of the set of constraints for which the one or more processors were unable to solve is identified. The first constraint corresponds to a first object of the plurality of objects associated with a first confidence value. At block 1050, that the vehicle should apply a maximum braking level greater than the acceptable braking limit based on the first confidence, a threshold, and the determination that the one or more processors are unable to solve for a trajectory is determined. At block 1060, based on the determination that the vehicle should apply the maximum braking level, the maximum braking level is applied to control the vehicle in the autonomous driving mode and in order to slow the vehicle down.

The features described herein may allow the vehicle's computing devices to use emergency braking in a safe and reliable way. By tying this braking to the confidence value that an object detected by the perception system exists as well as the type of that object, this reduces the likelihood of unnecessary, and in some cases, dangerous braking in inappropriate circumstances. For instance, if a child were to step in front of the vehicle onto the road, because even where the confidence value for the perception of that child were low, because children may have high priority level, the vehicle would automatically be able to use emergency braking. At the same time, if the perception system identifies an object with a low confidence value that emerges from behind a tree that is later not confirmed or observed again, the priority would be very low and thus, the vehicle would not inappropriately use the emergency braking. This, in turn, increases the safety and comfort of passengers within the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, from a perception system of a vehicle having an autonomous driving mode, information identifying a plurality of objects in an environment of the vehicle and a confidence value for each object of the plurality of objects being a real object;
determining, by the one or more processors, a priority level for at least one object of the plurality of objects based on the confidence value for the at least one object and a type of the at least one object;
determining, by the one or more processors, that the vehicle should apply a braking level greater than a braking limit based on the confidence value for the at least one object and the priority level for the at least one object; and
based on the determination that the vehicle should apply the braking level, applying, by the one or more processors, the braking level to control the vehicle in the autonomous driving mode and in order to slow the vehicle down.

2. The method of claim 1, further comprising:
comparing the priority level for the at least one object to a threshold value; and
based on the comparison, determining that the at least one object allows for the braking level.

3. The method of claim 1, wherein the braking level is a maximum braking limit for brakes of the vehicle.

4. The method of claim 1, wherein the confidence value for the at least one object corresponds to a number of iterations of a LIDAR sensor of the perception system in which the at least one object has been observed.

5. The method of claim 1, wherein determining that the vehicle should apply the braking level is further based on a comparison between the priority level for the at least one object and a threshold value.

6. The method of claim 5, further comprising, determining that the priority level for the at least one object meets the threshold value, and wherein determining that the vehicle should apply the braking level is further based on the determination that the priority level for the at least one object meets the threshold value.

7. The method of claim 1, wherein determining that the vehicle should apply the braking level is further based on a current speed of the vehicle.

8. The method of claim 1, wherein determining that the vehicle should apply the braking level is further based on a detected speed of one or more of the plurality of objects.

9. The method of claim 8, wherein determining that the vehicle should apply the braking level is further based on a current speed of the vehicle.

10. The method of claim 1, wherein determining that the vehicle should apply the braking level is further based on a type of road on which the vehicle is currently driving.

11. The method of claim 1, wherein determining that the vehicle should apply the braking level is further based on whether the vehicle is currently driving on a highway.

12. The method of claim 1, wherein determining that the vehicle should apply the braking level is further based on a speed limit of a road on which the vehicle is traveling.

13. The method of claim 1, wherein determining that the vehicle should apply the braking level is further based on a speed of another vehicle in the environment of the vehicle.

14. The method of claim 1, wherein applying the braking level is further based on whether another vehicle is behind the vehicle.

15. The method of claim 14, wherein applying the braking level is further based on whether the other vehicle meets a predetermined threshold with respect to a current location of the vehicle.

16. The method of claim 1, wherein determining that the vehicle should apply the braking level is further based on a current driving situation for the vehicle, wherein the current driving situation relates to an environment in which the vehicle is currently driving.

17. A system comprising:
one or more processors configured to:
receive from a perception system of a vehicle having an autonomous driving mode, information identifying a plurality of objects in an environment of the vehicle and a confidence value for each object of the plurality of objects being a real object;
determine a priority level for at least one object of the plurality of objects based on the confidence value for the at least one object and a type of the at least one object;
determine that the vehicle should apply a braking level greater than a braking limit based on the confidence value for the at least one object and the priority level for the at least one object; and
based on the determination that the vehicle should apply the braking level, apply the braking level to control the vehicle in the autonomous driving mode and in order to slow the vehicle down.

18. The system of claim 17, wherein the one or more processors are further configured to:
   compare the priority level for the at least one object to a threshold value; and
   based on the comparison, determine that the at least one object allows for the braking level.

19. The system of claim 17, wherein the braking level is a maximum braking limit for brakes of the vehicle.

* * * * *